United States Patent [19]

Yamaura et al.

[11] 4,419,737
[45] Dec. 6, 1983

[54] SETTING DEVICE FOR PROTECTIVE CONTROL SYSTEM

[75] Inventors: Mitsuru Yamaura, Hachioji; Ryotaro Kondow, Tokyo; Junichi Inagaki, Fuchu; Kunio Matsuzawa, Sagamihara, all of Japan

[73] Assignee: Tokyo Shibaura Denki Kabushiki Kaisha, Kawasaki, Japan

[21] Appl. No.: 157,340

[22] Filed: Jun. 9, 1980

[30] Foreign Application Priority Data

Jun. 15, 1979 [JP] Japan .................................. 54-75375

[51] Int. Cl.³ .............................................. G06F 13/00
[52] U.S. Cl. .............................................. 364/900
[58] Field of Search ... 364/900 MS File, 200 MS File, 364/184, 185, 186; 371/68

[56] References Cited

U.S. PATENT DOCUMENTS

| | | | |
|---|---|---|---|
| 3,387,282 | 6/1968 | Jacques | 364/185 X |
| 3,636,331 | 1/1972 | Amrehn | 364/200 |
| 3,741,246 | 6/1973 | Braytenbah | 364/200 X |
| 3,798,612 | 3/1974 | Struger | 364/900 |
| 3,813,649 | 5/1974 | Struger | 364/900 |
| 3,947,665 | 3/1976 | Hundley | 364/185 X |
| 4,078,259 | 3/1978 | Soulsby | 364/900 |
| 4,118,789 | 10/1978 | Casto | 364/900 |
| 4,131,942 | 12/1978 | Gillett | 364/200 |
| 4,137,565 | 1/1979 | Mager | 364/200 |
| 4,161,027 | 7/1979 | Russell | 364/200 X |
| 4,347,581 | 8/1982 | Yamaura | 364/900 |

*Primary Examiner*—Raulfe B. Zache
*Attorney, Agent, or Firm*—Oblon, Fisher, Spivak, McClelland & Maier

[57] ABSTRACT

Digital setting value data, having been stored in a first non-volatile memory in response to the operation of a first switch, is transferred to and memorized in a second non-volatile memory. Stored setting value data is read out from at least one of the first and second memories under the control of an address control circuit and coupled to a digital processing section for carrying out digital arithmetic processing for protective control in the processor.

5 Claims, 13 Drawing Figures

4,419,737

SETTING DEVICE FOR PROTECTIVE CONTROL SYSTEM

BACKGROUND OF THE INVENTION

1. Field of the Invention

This invention relates to a setting device for a protective control system for effecting the protective control of a power transmission system or the like by using a digital arithmatic processing unit such as a microcomputer.

2. Description of the Prior Art

In the prior-art protective control system, for instance, a protective relay system used for a power transmission system, setting taps, rotary switches and variable resistors are provided for distance relay elements, overvoltage relay elements etc., and overcurrent relay elements so that the value for each element can be independently set. For example, in a distance protective relay system for protecting a power transmission line, overcurrent relays, undervoltage relays, mho relays, reactance relays, earthing overvoltage relays, directional relays, etc., are used in combination. In such protective relay systems, there are sometimes several tens of setting values to be set for respective relay elements included in the system. In addition, the individual setting values vary with the system in which the protective system is employed. The setting operation therefore requires the calculations of a highly skilled engineer.

In light of the recent progress in digital data processing techniques, the incorporation of digital arithmatic processing units such as microcomputers, in such protective control systems has been proposed. A great advantage of such a digital protective control system is that a number of its elements can be processed with the same hardware after a combination of programs is stored in the digital arithmetic processing unit. Thus, the size of the system can be reduced, compared to that of the prior art which is constructed by combining a number of protective relay element circuits.

However, it is undesirable from the standpoint of size reduction for a number of setting sections for respective relay elements to be provided in such a digital protective control system. Accordingly, a system in which a plurality of setting values are written from a single setting section to a memory within a digital processing unit and selectively read out when required is under consideration. Such setting systems are basically classed into two types, depending upon the kind of the memory used.

Namely, one system uses the random access memory (RAM), a memory capable of reading and writing data at any time. A drawback in this system is that the data memorized in the RAM is erased when a power source connected thereto is lost. In other words, when the power source is lost or removed due to power failure or maintenance of the system, it is necessary to set a plurality of values. This is a very cumbersome and impractical process.

The other system uses the read only memory (ROM). As with ROM, commonly termed IC memories are used in cases in which such memories are assembled in microcomputors or the like in order to meet the requirements for miniaturization. Data which has been once written in the ROM will not be lost even when the power source fails. However, an exclusive writing unit called an ROM writer is necessary in order to write in the data. Furthermore, once the data has been written it cannot be easily changed. This is very inconvenient in view of the maintenance and application of the system.

Still further, in either of these two system the normal operation as the protective control system must be stopped when changing a setting value. A power transmission system or the like which is protected by the protective control system fails to be protected during this period. This is inconvenient in view of the maintenance.

An object of the invention, accordingly, is to provide a setting device for a protective control system, with which the setting and alteration of setting values can be readily made and with which the setting value once memorized, is not lost even when the power source is lost, and the regular protective control function of which is maintained even when changing a setting value.

According to the invention, the above object is achieved by a setting device for a protective control system, which comprises first and second non-volatile memories, a control signal generating means for controlling the preservation and erasion of the data stored in the first and second non-volatile memories, a setting section for producing setting value data to be memorized in the first non-volatile memory, a means for writing the setting value data in the first non-volatile memory, means for causing the setting value data memorized in the first non-volatile memory to be read out therefrom and transferred to and memorized in the second non-volatile memory, and a processing section for effecting arithmetic processing for protective control by reading out memorized data from at least either one of the first and second memories.

BRIEF DESCRIPTION OF THE DRAWINGS

This invention can be more fully understood from the following detailed description and its accompanying drawings, in which.

DESCRIPTION OF THE PREFERRED EMBODIMENTS

Figure 1:
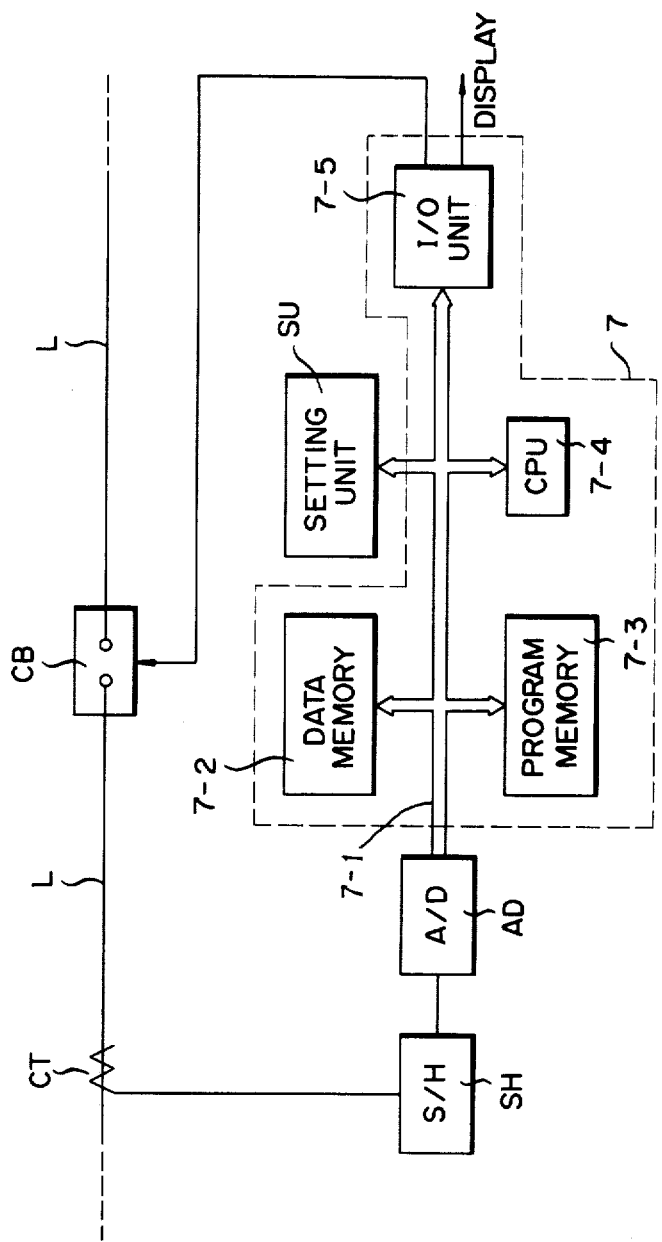
FIG. 1 is a block diagram showing the setting device for a protective control system according to the invention applied to a protective relay system for a power transmission system.

Referring now to the drawings, wherein like refernce numerals designate identical or corresponding parts throughout the several views, and more particularly to FIG. 1 thereof, there is shown a block diagram outlining the setting device for a protective control system according to the invention applied to a protective relay system for a power transmission system. Before describing the preferred embodiments of the invention, the construction and operation of the protective relay system will be described with reference to FIG. 1. In FIG. 1, designated at L is a power transmission line, in which a current transformer CT and a circuit breaker CB are inserted. An output terminal of the current transformer CT is connected to the input terminal of a sample/hold circuit SH. A detection signal representing the condition of the current in or voltage on the line L, detected by the current transformer CT, is sampled by the sample/hold circuit SH. The output terminal of the sample/hold circuit SH is connected to the input terminal of a next-stage analog-to-digital (A/D) converter AD. The sampled detection signal, which is an analog signal, is converted by the A/D converter AD into a corresponding digital signal. The digital signal obtained in this way is supplied from the A/D converter AD through a data bus 7-1 in a digital operational processor 7 to a data memory 7-2 therein and memorized in the data memory 7-2. The digital operational processor unit 7 also includes a program memory 7-3, a central processing unit (CPU) 7-4 and an input/output (I/O) unit 7-5. The setting unit SU according to the invention is also coupled to the data bus 7-1. A protective control output of the digital operational processor 7 is obtained from the I/O unit 7-5. It is supplied to a display unit for display thereon, and is also supplied as a trip command to a tripping terminal of the circuit breaker CB.

In cases in which the system shown in FIG. 1 is used as, for instance, overcurrent protection relay, predetermined calculations are made with data stored in the data memory 7-2, representing the value of current flowing through the line L according to a program stored in the program memory 7-3. The result of the calculations is compared with a value set by the setting device SU. If the result of the calculations is greater than the set value, the processor determines that there is overcurrent in the line L, and a trip command is delivered from the I/O unit 7-5 to the circuit breaker CB to open it. In the setting unit SU, a plurality of values for various relay elements are set in advance. These setting values are successively read out according to a program stored in the program memory 7-3 for operational processing.

Figure 2:
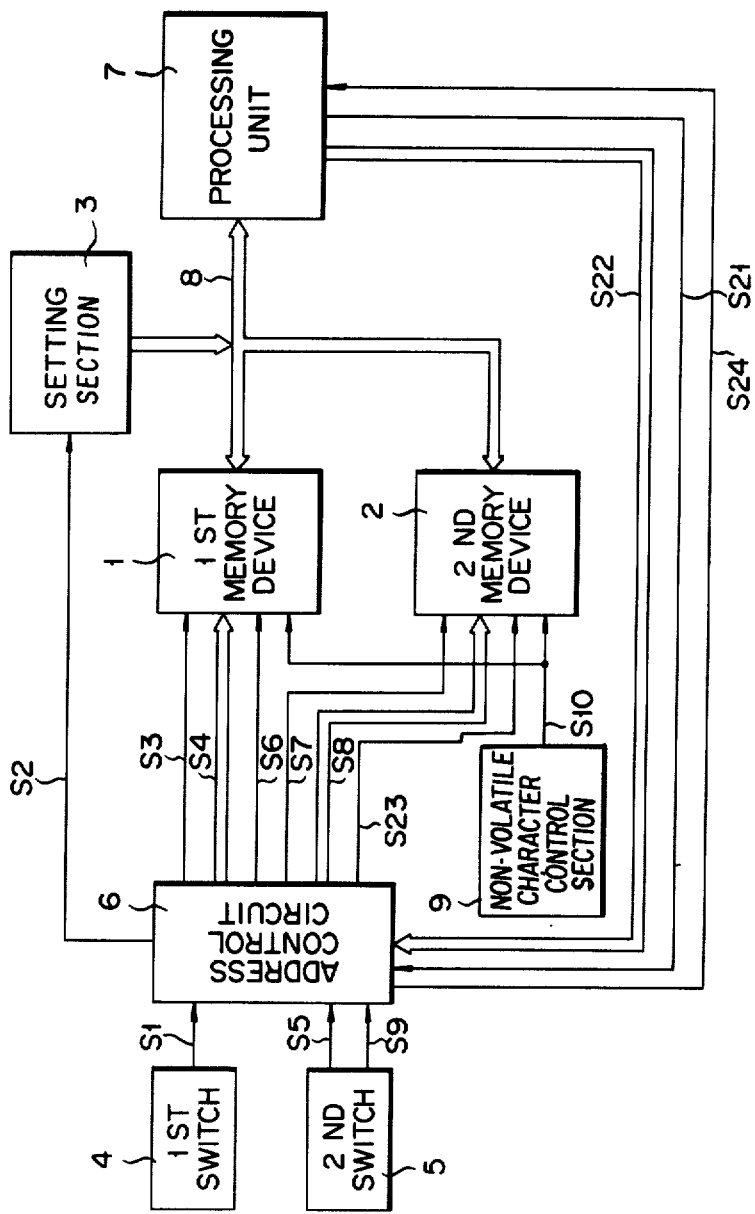
FIG. 2 is a block diagram showing an embodiment of the setting device for a protective control system shown in FIG. 1.

An embodiment of the setting unit according to the invention will now be described with reference to FIG. 2. The setting unit SU shown in FIG. 1 corresponds to the circit of FIG. 2, except for the processing section 7. In FIG. 2, a first memory capable of both writing and reading is designated as 1. It is a non-volatile memory, that is, it will not lose its retained data even if its power supply is cut due to, for example, power failure. Designated at 2 is a second memory which has the same character as the first memory 1 and is provided in parallel with the first memory 1. Generally available memories with this character are core memories and semiconductor memories. In this embodiment, a semiconductor memory, for instance non-volatile utilizing an MNOS (metal-nitride-oxide semiconductor) is used. In this memory, each memory cell comprises a pair of an ordinary volatile MOS (metal-oxide semiconductor) flip-flop and an MNOS FET for memorizing non-volatile information. These MNOS FETs can preserve the memorized information even if their control power supply is lost. This means that the data memorized before the loss of the control power supply can be reproduced by transferring data memorized in the MNOS FETs back to the MOS flip-flop after the recovery of the power supply. A setting section for setting data in the memory section is designated as 3. A first switch for producing a write signal $S_1$ for writing the setting value data from the setting section 3 in a predetermined address in the first memory 1 is designated as 4. 5 designates a second switch for producing a transfer signal $S_5$ for transferring the memorized data from the first memory 1 to the second memory 2 and a setting period indication signal $S_9$ indicating the setting period. A thumb-wheel switch or a rotary switch delivering a BCD signal may be used as the setting section 3. 6 designates an address control circuit, to which the write signal $S_1$ produced from the first switch 4 with the operation thereof, the transfer signal $S_5$ produced from the second switch 5 with the operation thereof, and the setting period indication signal $S_9$ are coupled. When the address control circuit 6 receives the write signal $S_1$, its control action is caused to produce a permit signal $S_2$ for producing the setting value data in the setting section 3, a first write signal $S_3$ for writing input data in the first memory 1, and a first address signal $S_4$ for specifying an address in which to write the input data coupled to the first memory 1. The first address signal $S_1$, which varies with the element for which a certain value is to be set, is set in the address control circuit 6. When the address control circuit 6 receives the transfer signal $S_5$ produced from the second switch 5, it produces a first read signal $S_6$ and the first address signal $S_4$ for reading out the memorized data from the first memory 1 and also a second write signal $S_7$ and a second address signal $S_8$ for writing the memorized data output from the first memory 1 in the second memory 2. In this case, the first and second address signals $S_4$ and $S_8$ during the transfer are progressively changed when the transfer signals $S_5$ is once received for transferring all the data memorized in the first memory 1. The processing section 7 carries out operations for the protective control when the memorized data is read out from the second memory 2 by using a data bus 8. When the data bus 8 is not used, the processing section 7 gives a request signal $S_{21}$ and a third address signal $S_{22}$ for reading out the memorized data from the second memory 2. This processing section 7 is usually constituted by a digital arithmetic unit, such as a microcomputer having a construction as shown in FIG. 1. When the request signal $S_{21}$ is supplied to the address control circuit 6 in cases when the reading from the second memory is permitted, circuit 6 produces the second address signal $S_8$ and second read signal $S_{23}$, thus coupling the memorized data in the second memory 2 through the data bus 8 to the processing section 7. In cases in which the reading of the memory 2 is not permitted, it gives a wait signal $S_{24}$ to the processing section 7. 9 designates a non-volatile character control section which supplies a non-volatile character control signal $S_{10}$ to both the memories 1 and 2 for controlling the non-volatile character thereof.

To the data bus 8 the first and second memories 1 and 2, setting section 3 and processing section 7 are connected.

Figure 3:
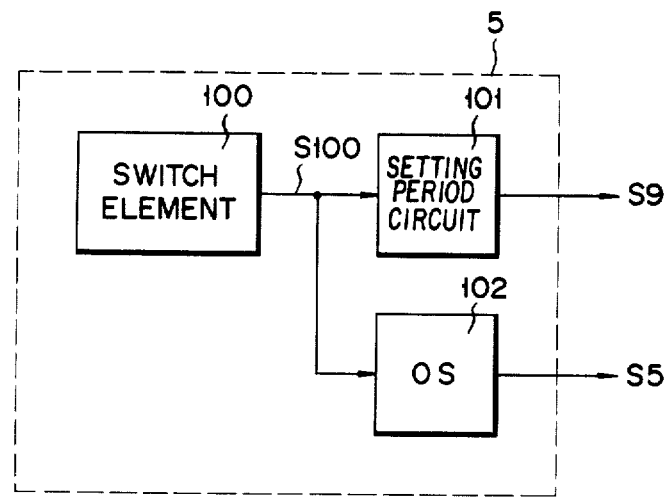
FIG. 3 is a block diagram showing the construction of the second switch shown in FIG. 2.

FIG. 3 shows a specific example of the second switch 5. In this switch, a switch element 100 produces, when turned on, a switch output $S_{100}$ of a level "1" coupled to a setting period circuit 101 and also to a one-shot circuit 102. The setting period circuit 101 delays the aforementioned setting period indication signal $S_9$ till the lapse of a period $T_1$ from the instant when it receives the switch output $S_{100}$. The first one-shot circuit 102 receives the switch output $S_{100}$ and produces the transfer signal $S_5$, which is a one-shot pulse having a duration $T_2$, by detecting the falling of the switch output $S_{100}$ caused when the switch element 100 is turned off. The duration $T_2$ of the oneshot pulse is set to be shorter than the delay period $T_1$ provided by setting period circuit 101.

Figure 4:
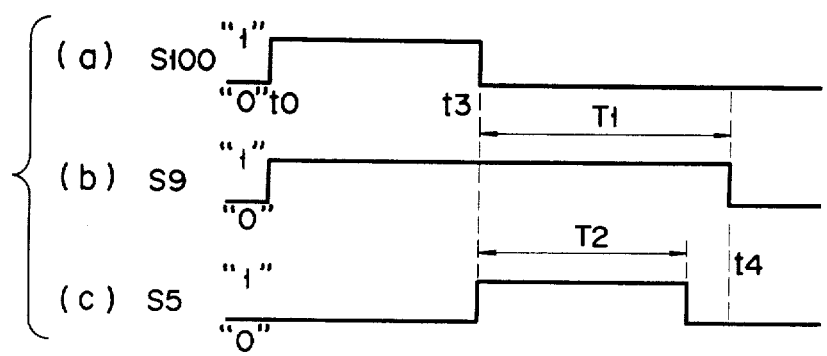
FIG. 4 is a time chart illustrating the operation of the circuit of FIGS. 2 and 3.

The time chart of FIG. 4 illustrates the signals involved in the construction of FIG. 4. In FIG. 4, the switch output $S_{100}$ is labeled (a), and the setting period indication signal $S_9$ is labeled (b), and the transfer signal $S_5$ is labeled (c). As shown in (a), the switch element 100 is turned on at an instant $t_0$ and turned off at an instant $t_3$. The setting period indication signal $S_9$, as shown in (b), is at level "1" from the instant $t_0$ until the end of the period $T_1$ after the instant $t_3$, i.e., until an instant $t_4$. The transfer signal $S_5$, as shown in (c), is at level "1" from the instant $t_3$ until the instant $t_5$.

The address control circuit 6 in the system of FIG. 2 will now be described in detail with reference to FIG. 5.

Figure 5:
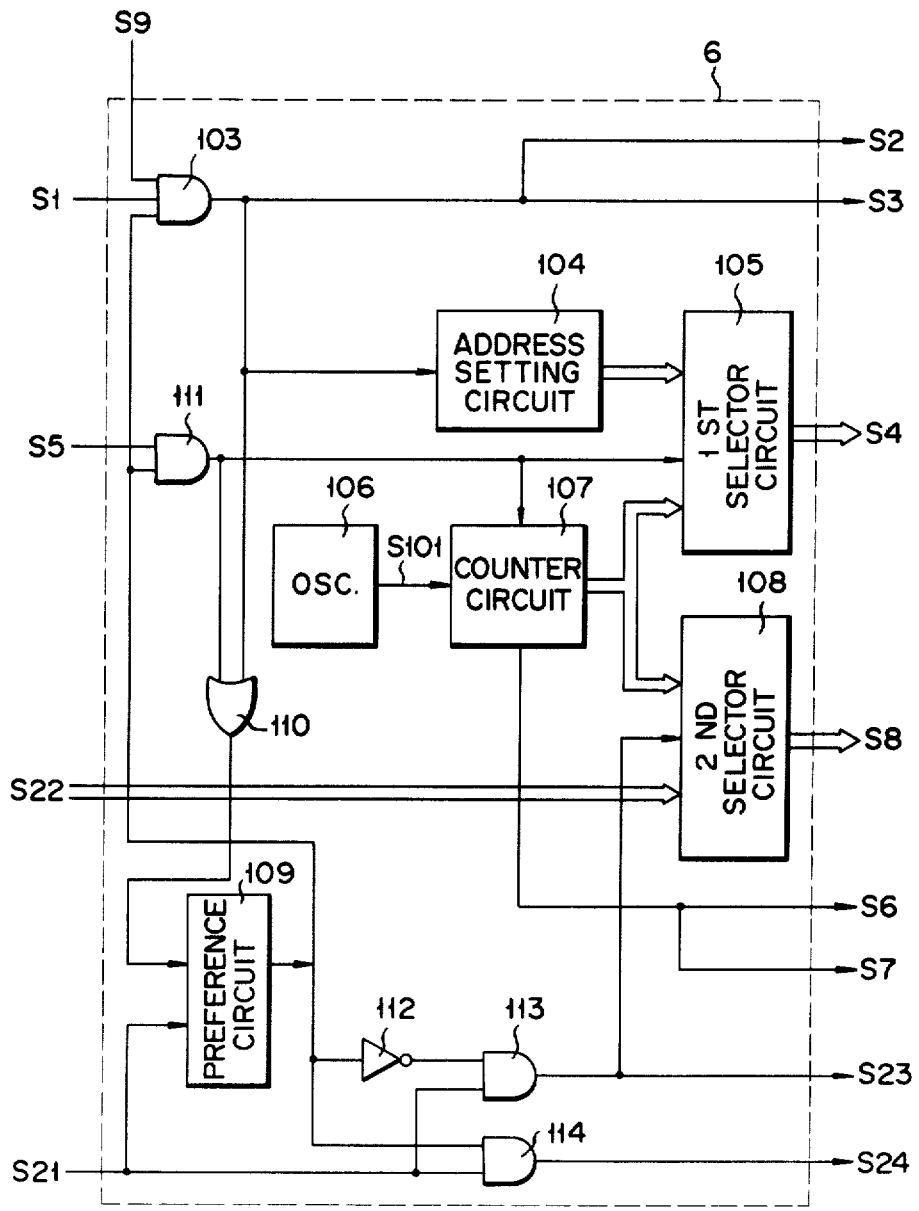
FIG. 5 is a block diagram showing an example of the address control circuit in the embodiment of FIG. 2.

FIG. 5 is a block diagram showing a specific example of the address control circuit 6. In FIG. 5, an AND circuit 103 receives the AND of the aforementioned setting period indication signal $S_9$ the write signal $S_1$, and the output of a preference circuit 109. When the input condition is satisfied, it supplies the permit signal $S_2$ and first write signal $S_3$ to the setting section 3. The preference circuit 109 discriminates whether or not the use of the data bus 8 is permitted. When there is a request for the use of the bus from the processing section 7 or setting section 3 while the bus is being used by one of these sections, the preference circuit 109 causes the other requesting unit to wait until the preceding processing on the one using the bus is completed, as will be described later. When the setting operation is being performed, the circuit 109 produces an output "1". At this time, if the second switch 5 is "on" and producing the setting operation indication signal $S_9$ and also, if the use of the data bus $S_1$ is permitted, the write signal $S_1$ is provided as the permit signal $S_2$ and second write signal $S_3$. The output of the AND circuit 103 is also coupled to an address setting circuit 104 and an OR circuit 110. The address setting circuit 104 sets different addresses with different elements usually by means of a rotary switch. When the output of the AND circuit 103 is supplied, the address setting circuit 104 supplies an address output to a first selector circuit 105. The first selector circuit 105 switches the first address signal $S_4$ at the time of the writing and at the time of the transfer. At the time of the writing, the output of the address setting circuit 104 is provided as the first address signal $S_4$. A second AND circuit 111 takes the AND of the transfer signal $S_5$ and the output of the preference circuit and, when the use of the data bus 8 is permitted, supplies a transfer permit signal to a counter circuit 107, the first selector circuit 105, and an OR circuit 110. A clock signal $S_{101}$ produced from an oscillator circuit 106 is coupled to the counter circuit 107. When the counter circuit 107 receives the output of the AND circuit 111, it starts to count clock pulses of the clock signal. Its count value is then coupled to the first selector circuit 105 and also to a second selector circuit 108. This count value constitutes the first and second address signals $S_4$ and $S_8$ at the time of the transfer, and the counter circuit 107 is reset when the count thereof reaches an address value required for the transfer. The counter circuit 107 also provides the clock signal $S_{101}$ as the first read signal $S_6$ and second write signal $S_7$ while it is counting this clock signal. Thus, when the transfer signal $S_5$ is produced and the use of the data bus 8 is permitted, the first selector circuit 105 is switched such that the output of the counter circuit 107 is coupled to it, that is, the output of the counter circuit 107 is provided as the first address signal $S_4$. The output of the counter circuit 107 is also provided as the second address signal $S_8$ through the second selector circuit 108. While the second selector circuit 108 normally provides the output of the counter circuit 107 as the second address signal $S_8$, when the processing section 7 reads out the data from the second memory 2, it is switched such that the third address signal $S_{22}$ is provided as the second address signal $S_8$ through it. The request signal $S_{21}$ from the processing section 7 is coupled to the preference circuit 109, an AND circuit 113 which takes the AND of the signal $S_{21}$ and an inversion signal from a NOT circuit 112 inverting the output of the preference circuit 109, and an AND circuit 114 which takes the AND of the signal $S_{21}$ and the output of the preference circuit 109. The preference circuit 109 receives the output of the first OR circuit 110 and the request signal $S_{21}$ and produces output in the aforementioned action. Thus, when the request signal $S_{21}$ is supplied during the use of the data bus 8 in the setting operation, the AND circuit 114 provides the wait signal $S_{24}$ causing the processing section 7 to wait until the use of the data bus 8 in the setting operation is ended, while the input AND condition of the AND circuit 113 is not satisfied so that the AND circuit 113 provides no output. When the request signal $S_{21}$ is supplied in a state of the data bus 8 not used in the setting operation, the output of the preference circuit 109 becomes "0". At this time, no output is provided from the first and second AND circuits 103 and 111 so that the setting operation is postponed until the use of the data bus 8 by the processing section 7 is ended. The duration of the write signal $S_1$ and transfer signal $S_5$ is set to be sufficiently long compared to the duration of the request signal $S_{21}$. When the output of the preference circuit 109 is "0", the AND circuit 114 does not provide the wait signal $S_{24}$, and the output of the AND circuit 113 coupled to the NOT circuit 112 is "1", so that the request signal $S_{21}$ is provided as the second read signal $S_{23}$ and the switching signal to the second selector circuit 108. Thus, the output of the third address signal $S_{22}$ is provided as the second address signal $S_8$ to permit reading from the second memory 2 by the processing section 7. When this reading is ended, the request signal $S_{21}$ disappears, so that the output of the preference circuit 109 becomes "1".

Figure 6:
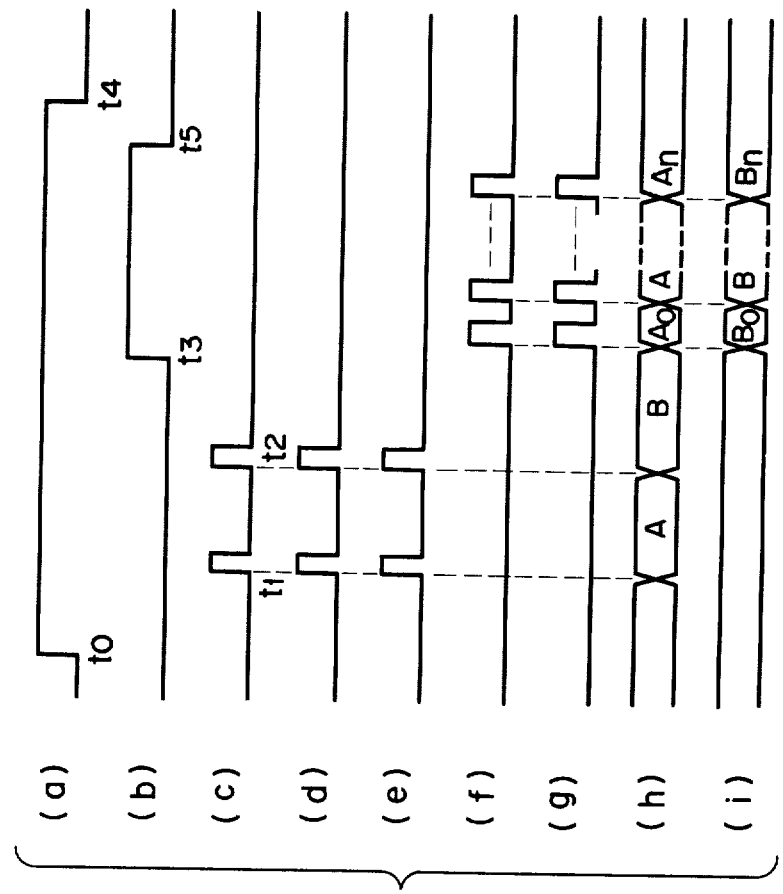
FIG. 6 is a time chart illustrating the operation of the embodiment shown in FIG. 2.

The operation of the setting unit in the protective control system of the above construction will not be described with reference to the time chart of FIG. 6. In FIG. 6, the setting operation indication signal $S_9$, is labeled (a) the transfer signal $S_5$ is labeled (b), the write signal $S_1$ is labeled (c) the permit signal $S_2$ is labeled (d), the first write signal $S_3$ is labeled (e), the second write signal $S_7$ is labeled (f), the first read signal $S_6$ is labeled (g), the first address signal is labeled (h) and the second address signal is labeled (i).

The setting operation is started by turning "on" the second switch 5 (shown in FIGS. 3 and 4). When the switch 5 is turned "on" at an instant $t_0$, the setting operation indication signal $S_9$ is produced. This setting operation indication signal $S_9$ is extended by the time limit delay circuit 101 (FIG. 3) after the second switch 5 is turned "off" at an instant $t_3$ (i.e., instant of transfer) until the setting operation is completed at an intant $t_4$. This setting operation indication signal $S_9$ serves to prevent erroneous setting, and the setting operation is made possible only during the period, during which the signal $S_9$ is present as the input to the address control circuit 6. The setting section 3 effects the setting of a setting value. The setting data is written in the first memory 1 when the first switch 4 is turned "on". The control involved at this time is as shown in FIG. 6 at an instant $t_1$. More particularly, when the first switch 4 is turned "on", the write signal $S_1$ is produced and coupled to the address control circuit 6. As is apparent from FIG. 5, when this write signal $S_1$ is supplied, the permit signal $S_2$ for permitting the output of the setting section 3, the first write signal $S_3$ for writing the setting data in the first memory 1 and the first address signal $S_4$ for specifying the address in which to write the setting data are produced. The address value is set within the address control circuit 5. If this address value is "A", the setting data from the setting section 3 is written in the address "A" of the first memory 1. At an instant $t_2$ in FIG. 6, the setting is made for a different element. At this time, the control is the same as the setting at the instant $t_0$ as described above except that the address value of the first address signal $S_4$ is this time "B". At this time, the data for the old setting value is retained in the second memory 2, so that in the processing unit 7 the arithmetic processing can be continually made on the basis of the retained data. This means that even with a system in which the setting values for a plurality of elements are related to one another so that unnecessary operations are caused when the setting for only one of the elements is changed, there is no need to stop the system when changing the setting. This is very effective. When the operation of setting is ended, the second switch 5 in the switch element is turned off. When the switch element 100 is turned "off" at an instant $t_3$, a one-short circuit 102 for producing the transfer signal $S_5$ for a constant period of time $T_2$ is immediately rendered operative, and the setting operation indication signal $S_9$ is extended by the time limit delay device 101 up to an instant $t_4$. Thus, when the transfer signal $S_5$ is supplied to the address control circuit 6 at the instant $t_3$, the memorized data in the first memory 1 is transferred to the second memory 2 during the period between the instants $t_3$ and $t_4$. More particularly, the address control circuit 6 supplies the first read signal $S_6$ and first address signal $S_4$ to the first memory 1 for successively reading out the memorized data from the first memory 1. At the same time, it supplies the second write signal $S_7$ and second address signal $S_8$ to the second memory 2 for progressively writing the successively read-out data in the second memory 2. A regularly increasing or decreasing output of a counter of the like may be used as the first and second address signals $S_4$ and $S_8$ at the time of the transfer, or the cases in which where the address values are progressively $A_0, A_1, \ldots, A_n$ and $B_1, B_2, \ldots, B_n$ are shown in (h) and (i) in FIG. 6. In this way, the same setting value as the memorized data in the first memory 1 is transferred to the second memory 2 to complete the setting operation. At the instant $t_4$, the setting operation indication signal $S_9$ vanishes.

Meanwhile, the reading of the memorized data from the second memory 2 by the processing section 7 is effected as soon as the request signal $S_{21}$ and third address signal $S_{22}$ are supplied from the processing section 7 to the address control circuit 6, unless the data bus 8 is busy, i.e., except when the setting data from the setting section 3 is being written in the first memory 1 and when the aforementioned transfer is being made. When the data bus 8 is being used, however, with the appearance of the request signal $S_{21}$ at the input of the address control circuit 6, the wait signal $S_{24}$ is supplied from the address control circuit 6 to the processing section 7 to postpone the reading operation until the data bus 8 becomes available for use for the reading. In this way, the processing section 7 reads out the memorized data from the second memory 2 and effects calculations for the control of protection.

Measures against the power stoppage will now be described. Referring to FIG. 2, when the control power source is going to be lost, the non-volatile character control section or memory control signal generator 9 detects this and delivers the non-volatile character control signal $S_{10}$ to the first and second memories 1 and 2. As a consequence, in the first and second memories 1 and 2, the data retained in the MOS flip-flops therein, i.e., the setting value, is written in the MNOS FETs, so that the setting value is preserved. When the control power source is recovered, the non-volatile character control section 9 again detects this, whereby the memorized data in the MNOS FETs is written again in the MOS flip-flop under the control of the non-volatile character control signal $S_{10}$. In this way, the setting value before the loss of the control power source can be reproduced to permit resumption of the arithmetic processing in the processing section 7. This power stoppage measure is taken either when the power stoppage takes place during the setting operation or at another time.

While in the embodiment of FIG. 2 described above, the setting operation indication signal $S_9$ is used for preventing erroneous setting, this signal $S_9$ need not be used in cases in which such a measure is unnecessary. Also, while the above description is concerned with reading out the memorized data from the second memory 2, it will be apparent that it is also possible to read out memorized data either from the first memory 1 or from both the first and second memories 1 and 2. That is, it is possible to permit the address control circuit 6 to produce the first read signal $S_6$ and first address signal $S_4$ in response to the request signal $S_{21}$ and third address signal $S_{22}$. Further, it is possible to permit data from the processing section 7 to be written as non-volatile data in the first or second memory 1 or 2.

Other embodiments of the invention will now be described.

Figure 7:
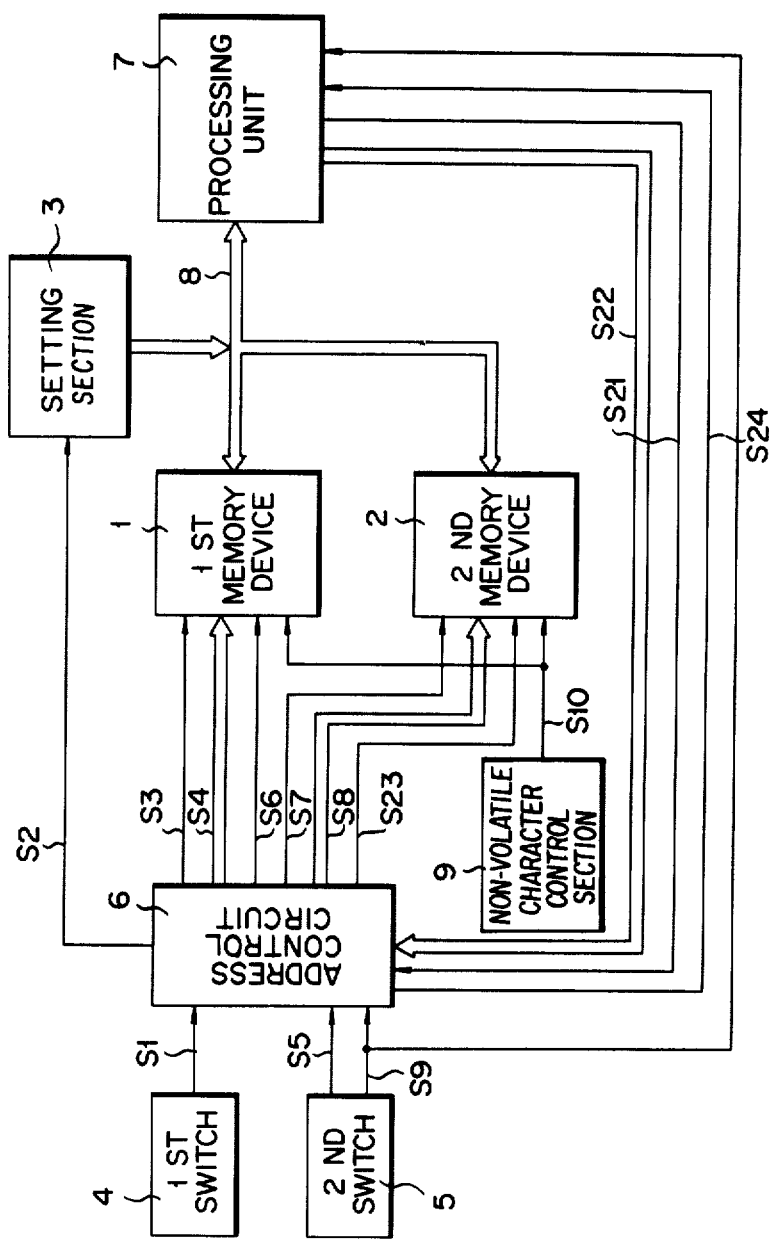
FIG. 7 is a block diagram showing a different embodiment of the invention.

(1) FIG. 7 shows a modification of the preceding embodiment of FIG. 2. In FIG. 7, parts similar to those of the preceding embodiment are designated by like reference symbols, and only those parts which are different from the preceding embodiment will be described here. While in the preceding embodiment of FIG. 2, either memorized data in the first memory 1 or that in the second memory 2 is used in the arithmetic processing in the processing section, in the arrangement of FIG. 1 the setting period indication signal $S_9$ is coupled not only to the address control circuit 6 but also to the processing section 7 for increasing the reliability thereof. The processing section 7 can thus read the state of the setting period indication signal $S_9$ and determine whether or not the setting operation is in force. Thus, during the setting period the arithmetic processing with the memorized data in either first or second memory 1 or 2 is carried out in the processing section 7. At times other than the setting period the memorized data in the first and second memories 1 and 2 are checked up with each other so as to effect the arithmetic processing with the memorized data only when the two data coincide. In this way, the reliability of the setting section can be enhanced. In addition, in the event that the two data do not coincide, a defectiveness display or an alarm output may be produced. Thus, prompt detection of the defectiveness of the system is possible. Also, if necessary, the protective control output of protective control processing may be inhibited upon detection of a faulty setting value to prevent malfunction of the system.

Figure 8:
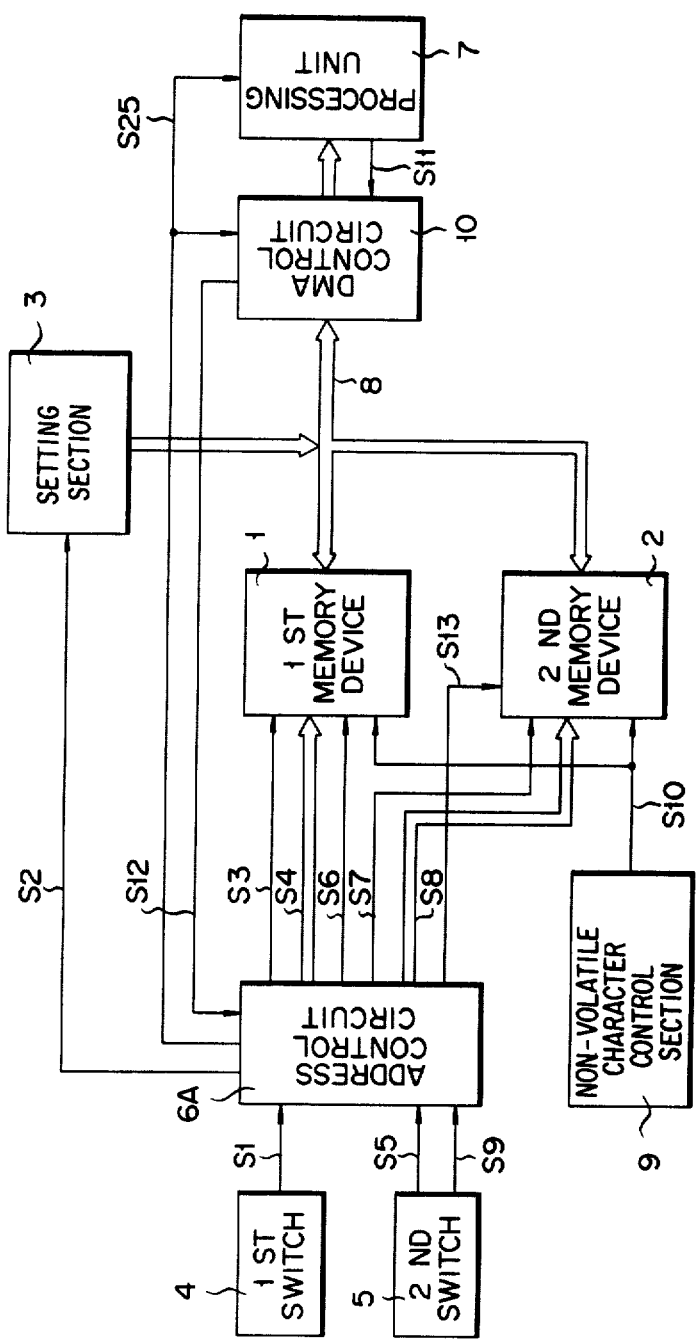
FIG. 8 is a block diagram showing a further embodiment of the invention.

(2) FIG. 8 shows another modification of the embodiment of FIG. 2. In this arrangement, a direct memory access (DMA) function is incorporated. In FIG. 8, parts similar to those in FIG. 2 are designated with like reference symbols, and only the parts different from the embodiment of FIG. 2 will be described. In the embodiment of FIG. 2, the memorized data in the first and second memories 1 and 2 are directly read out. Furthermore the response speed of the first and second memories is very slow compared to that of the processing section 7. A DMA control circuit 10, however, as shown in FIG. 8, permits the memorized data in the first and second memories 1 and 2 to be transferred to a data memory (not shown) in the processing section 7 during the non-operative period thereof, thereby increasing the processing efficiency. For the DMA control, the DMA control circuit 10 supplies a DMA signal $S_{12}$, which has a duration longer than the period required for reading out all the memorized data in the first and second memories 1 and 2, to address control circuit 6A. With the DMA signal $S_{12}$ supplied when the setting operation is not in force, i.e., in the absence of the setting period indication signal $S_9$, the address control circuit 6A supplies a first DMA permit signal $S_{25}$ to the DMA control circuit 10 and processing section 7 and also produces the first and second read signals $S_6$ and $S_{13}$ and first and second address signals $S_4$ and $S_8$. During the setting operation the DMA is inhibited, so that even if the DMA signal $S_{12}$ is supplied to the address control circuit 6A at this time, no signal concerning the DMA is produced from the address control circuit 6A. When the first DMA permit signal 25 is supplied to the DMA control circuit 10, it progressively latches the memorized data coupled from the first and second memories 1 and 2 through the data bus 8. When the section 7 is permitted the DMA operation with the first DMA permit signal $S_{25}$ supplied, the processing section 7 supplies a second DMA permit signal $S_{11}$ to the DMA control circuit 10. With the second DMA permit signal $S_{11}$ supplied, the DMA control circuit 10 produces the latched values.

Figure 9:
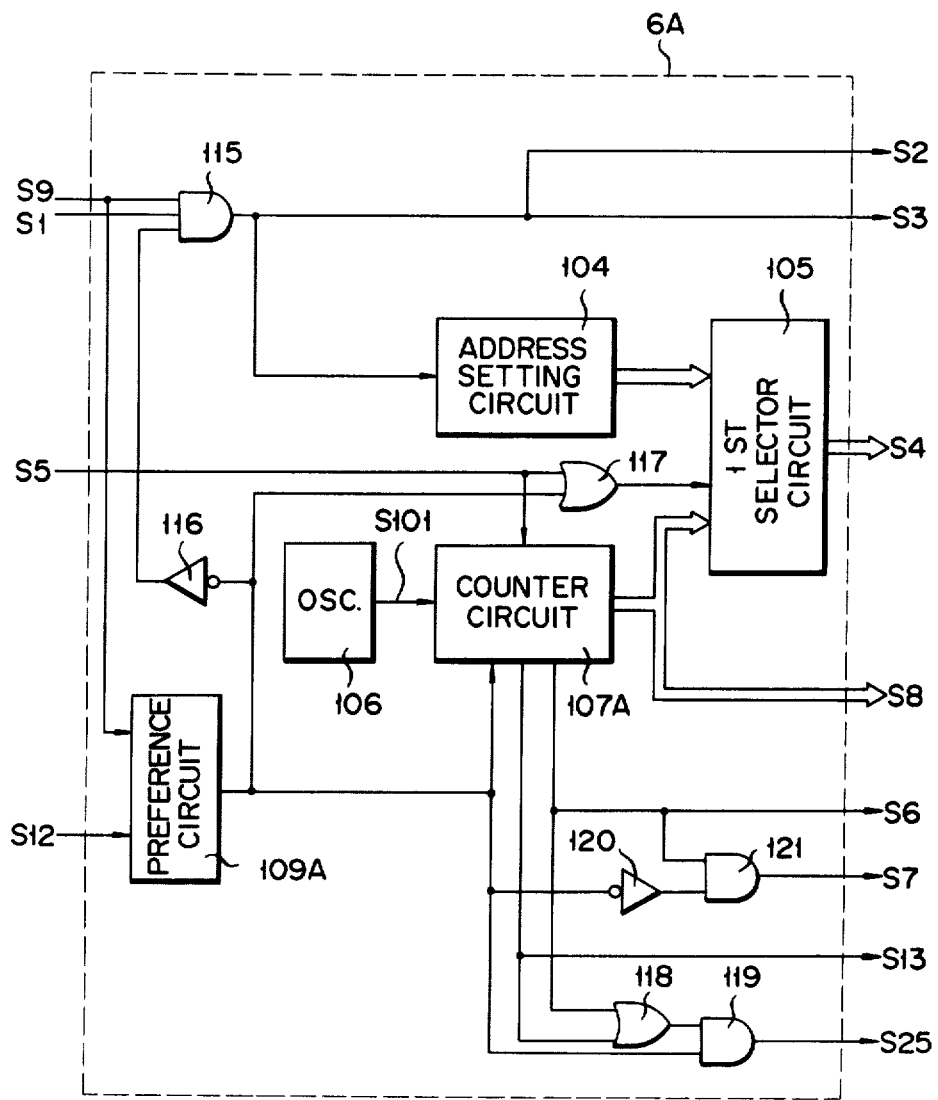
FIG. 9 is a block diagram showing the address control circuit in the embodiment of FIG. 8.

The details of the address control circuit 6A in the above arrangement of FIG. 8 will now be described with reference to FIG. 9. In FIG. 9, parts similar to those of FIG. 5 are designated by like reference symbols, and their description is omitted.

In FIG. 9, an AND circuit 115 receives the logical "AND" of the setting period indication signal $S_9$ and write signal $S_1$ and the inversion output of a NOT circuit 116 receiving the output of a preference circuit 109A. The preference circuit 109A receives the settting period indication signal $S_9$ and DMA signal $S_{12}$ and postpones the control processing according to the signal received later until the processing according to the preceding signal is ended. When the DMA signal $S_{12}$ is the preceding signal, its output is "1" and wherein the DMA signal $S_{12}$ vanishes, it is changed to "0". Since the duration of the DMA signal $S_{12}$ is short, even when the setting operation is postponed with preference given to the DMA, the write signal $S_1$ that is produced with the operation of the first switch 4 is not affected at all. Thus, the NOT circuit 116 provides the "1" output when the DMA processing is not in force and also after the DMA processing is ended. At this time, the write signal is produced from the AND circuit 115. The output of the AND circuit 115, coupled to the address setting circuit 104, is also coupled as the permit signal $S_2$ and first write signal $S_3$. The transfer signal $S_5$ is coupled to counter circuit 107A and is also coupled through an OR circuit 117 taking its OR and another input to the first selector circuit 105. The control by the transfer signal $S_5$ is the same as that shown in FIG. 5 except for the following points, the count value output of the counter circuit 107A is provided directly as the second address signal $S_8$. Also the second write signal $S_7$ is constituted by the output of an AND circuit 121, to which the first read signal $S_6$ and the inversion output of a NOT circuit 120 receiving the output of the preference circuit 109A are coupled. Thus, during the setting operation, the output of the preference circuit 109A is "0", so that the output of the NOT circuit 120 is "1" and the same signal as the first read signal $S_6$ is provided as the second write signal $S_7$. A further difference is that the first read signal $S_6$ is coupled together with the second read signal $S_{13}$ to an OR circuit 118. The output of the OR circuit 118 is at this time "1", thus providing "1" as one input to an AND circuit 119, which, however, produces no output this time since the output of the preference circuit 109A is "0".

When the setting operation is not in force and the the DMA signal $S_{12}$ is supplied the preference circuit 109A produces the "1" output. This output is coupled to the NOT circuit 116, OR circuit 117, counter circuit 107A, AND circuit 119 and NOT circuit 120. At this time, the output of the second NOT circuit 116 is "0", so that the AND circuit 115 which receives this output produces no output, since its input AND condition is not satisfied even with the setting period indication signal $S_9$ supplied to it. The OR circuit 117, receiving "1" as its input, produces "1" output. Thus, the switching signal to the first selector circuit 105 becomes "1", whereby the same switching as that at the time of the transfer as mentioned above is effected, and the output of the counter circuit 107A is provided as the first address signal $S_4$. With the "1" input to the counter circuit 107A, it produces a control signal for controlling the DMA. More particularly, it makes counting for the address output twice in succession, for successively reading out the memorized data in the first and second memories. Thus, successively varying address values are produced twice as the first and second address signals $S_4$ and $S_8$. However, at the time of the appearance of the first address output only the first read signal $S_6$ is produced to permit the reading from the first memory 1 only as at the time of the transfer. At this time, the output of the NOT circuit 120, receiving "1" as its input, is "0", and since this "0". Because output is coupled to the AND circuit 121, the second write signal $S_7$ is not produced. At the time of the appearance of the second address output, as is the case of the first read signal $S_6$, the clock signal $S_{101}$ is provided as the second read signal $S_{13}$, whereby reading from the second memory 2 is performed. Meanwhile, the first and second read signals $S_6$ and $S_{13}$ are coupled to the OR circuit 118, so that at the time of the reading from the first and second memories 1 and 2, a signal similar to the read signal is produced from the OR circuit 118. This signal is coupled to the AND circuit 119 and is directly provided as the first DMA permit signal $S_{25}$ since the output of the preference circuit 109A, constituting the other input to the AND circuit 119, is "1".

Figure 10:
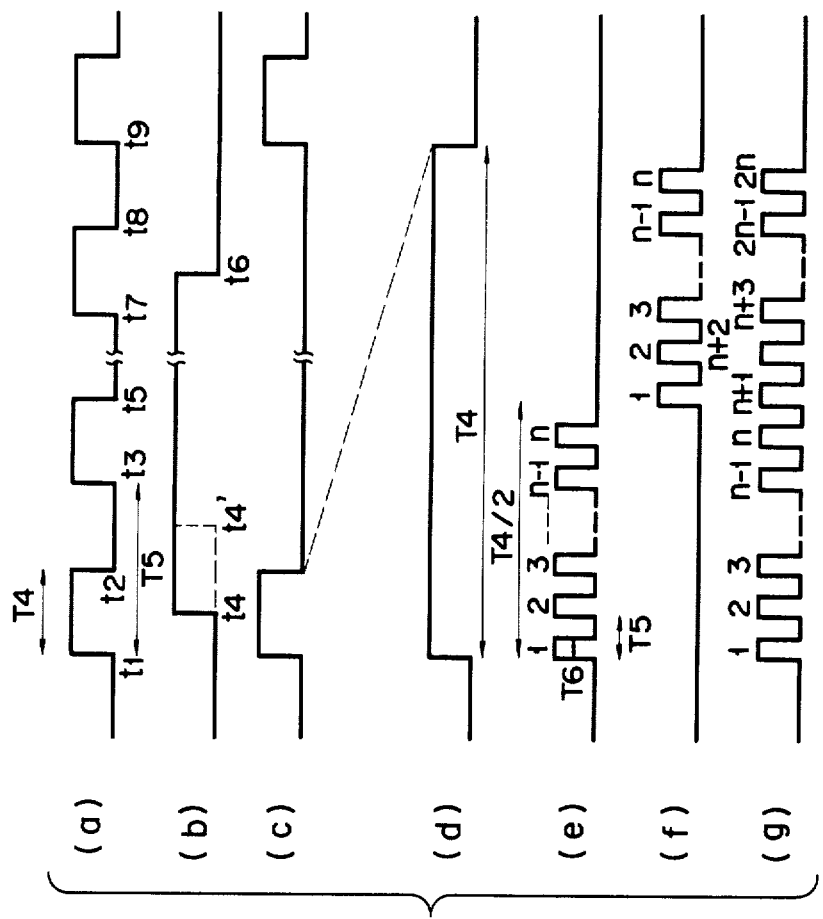
FIG. 10 is a time chart illustrating the operation of the embodiment of FIG. 8.

The operation of the circuit of FIG. 8 described above will now be described with reference to the time chart of FIG. 10. In FIG. 10, only the signals concerning the DMA are shown. The other signals involved are the same as those discussed in connection with FIG. 6 and are thus omitted.

In FIG. 10, the DMA signal $S_{12}$ is labeled (a), the setting period indication signal $S_9$, is labeled (b), and the output of the preference circuit 109A is labeled (c). Labeled (d) to (g) are signals involved in the control at the time of the DMA. More particularly, the signal (d) is the same as the output of the preference circuit 109A, (e) the first read signal $S_6$, (f) the second read signal $S_{13}$, and (g) the first DMA permit signal $S_{25}$. The DMA signal $S_{12}$ is a pulse signal having a pulse period $T_5$ and a pulse duration $T_4$, being "1" between instants $t_1$ and $t_2$ and "0" between instants $t_2$ and $t_3$. When the setting period indication signal $S_9$ is produced, for instance, at an instant $t_4$ between the instants $t_1$ and $t_2$, the preference circuit 109A provides the DMA signal $S_{12}$ as its output until the instant $t_2$. During the period between the instants $t_3$ and $t_5$, during which the DMA signal $S_{12}$ is provided, the output of the preference circuit 109A remains "0" since the setting period indication signal $S_9$ prevails. This state is continued until the setting period indication signal $S_9$ disappears at an instant $t_6$. If the instant $t_6$ is between instants $t_7$ and $t_8$, between which the DMA signal $S_{12}$ is "1", the output of the preference circuit 109A remains "0" at this instant, and it is "0" until the instant $t_9$ of the following rising of the DMA signal $S_{12}$. When the setting period indication signal $S_9$ is coupled between the instants $t_2$ and $t_3$ between which the DMA signal $S_{12}$ is "0", the preference circuit 109A provides the same output.

The control that is effected while the output of the preference circuit 109A is "1" will now be described. During a period from the instant $t_1$ and having one-half $T_4/2$ of the time width $T_4$ of the period, during which the DMA signal $S_{12}$ is "1", a first read signal $S_6$ is produced. This first read signal $S_6$ is a pulse train signal having a pulse period of $T_7$ and consisting of n pulses with a pulse duration of $T_6$. The number n is greater than the number of setting values memorized in the first memory 1. The second read signal $S_{13}$ is produced during the latter half of the period, during which the DMA signal $S_{12}$ is "1". This signal is again a pulse train signal having a pulse period of $T_7$ and consisting of n pulses with a pulse duration of $T_6$. As the first DMA permit signal $S_{25}$ the first and second read signals $S_6$ and $S_{13}$ are directly provided, that is, the signal $S_{25}$ is a pulse train signal having a pulse period of $T_5$ and consisting of 2n pulses with a pulse duration of $T_6$.

Through the DMA control the memorized data in the first and second memories 1 and 2 are successively transferred to the data memory in the processing section 7. Thus, as the setting value required for the arithmetic processing in the processing section 7 one in the data memory can be used, so that it is possible to increase the processing efficiency. The transfer of the setting value through the DMA function in this case is preferably periodically made from the standpoint of the reliability of the setting value which has an important role in the arithmetic processing.

(3) While in the previous embodiments of the invention a non-volatile character control section for detecting the loss and recovery of the control power source is used as a control method of the power stoppage measure for memory means using NVRAM (non-volatile random access meomory), it is also possible to adopt other means for the power stoppage measure.

Figure 11:
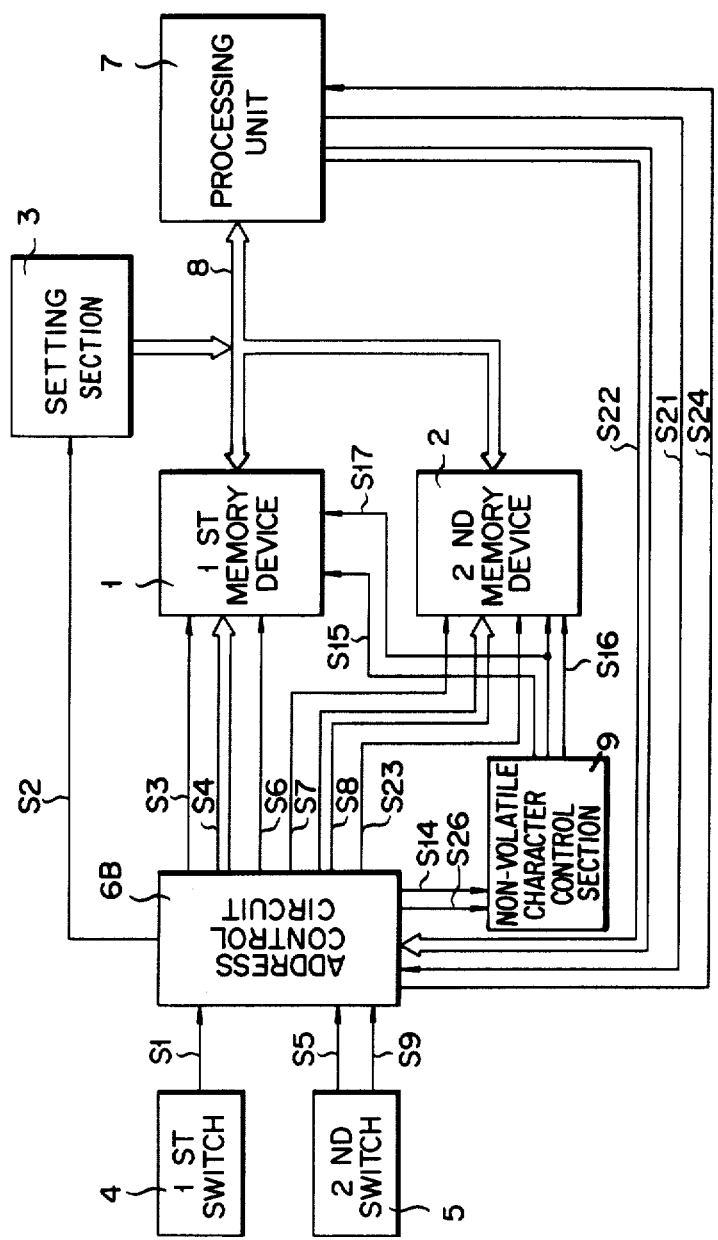
FIG. 11 is a block diagram showing a still further embodiment of the invention.

FIG. 11 shows a further embodiment incorporating a different power stoppage measure. Referring to FIG. 11, the non-volatile character control section 9 produces, when it receives a write end signal $S_{26}$ produced from address control circuit 6B as a result of coupling of the write signal $S_1$ thereto from the first switch 4, a first reserve signal $S_{15}$ coupled to the first memory 1. Also, when it receives a transfer end signal $S_{14}$ produced from the address control circuit 6B, it produces a second reserve signal $S_{16}$ coupled to the second memory 2. The first and second reserve signals $S_{15}$ and $S_{16}$ control the writing of data from the MOS flip-flops in the respective memories in the MNOS FETs therein. The non-volatile character control section 9 produces, upon detection of the instant of recovery of the control power supply, a reproduce signal $S_{17}$ coupled to the first and second memories 1 and 2 for reading out the data preserved in the MNOS FETs and writing again these data as reproduced data in the MOS flip-flops.

Figure 12:
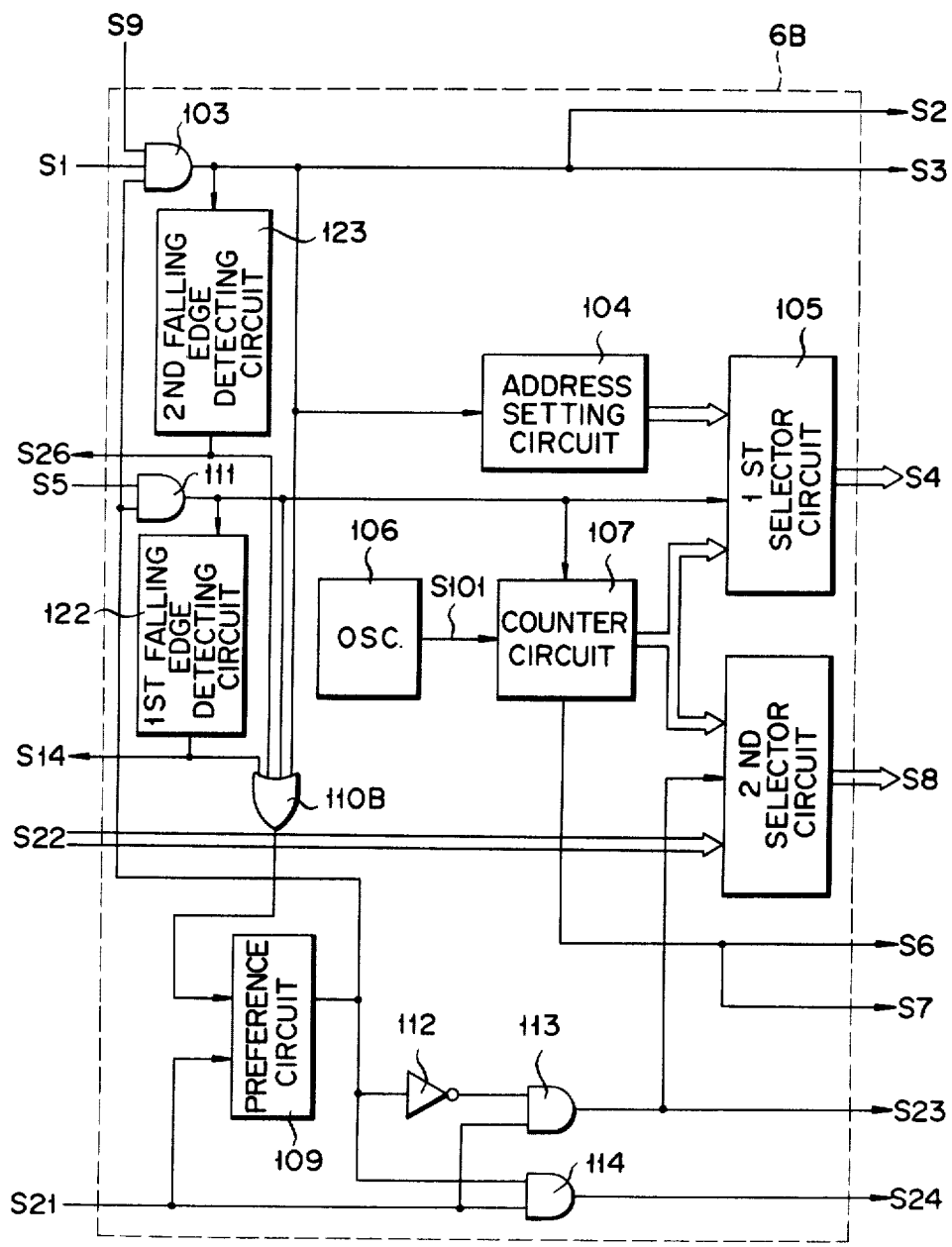
FIG. 12 is a block diagram showing an example of the address control circuit in the embodiment of FIG. 11.

The details of the address control circuit 6B in the embodiment of FIG. 11 will now be described with reference to FIG. 12. FIG. 12 shows a specific example of the address control circuit 6B. In FIG. 12, like parts as those in FIG. 5 are designated by like reference symbols, and their description is omitted. The circuit of FIG. 12 is set apart from the circuit of FIG. 5 in that first and second falling detection circuits 122 and 123 are additionally provided and that the transfer end signal $S_{14}$, which is the output of the first falling detection circuit 122, and the write end signal $S_{26}$, which is the output of the second falling detection circuit 123, are coupled to OR circuit 110B. The first falling detection circuit 122 receives the output of the AND circuit 111 and, by detecting the falling of the input, produces the transfer end signal $S_{14}$ which is a one-shot pulse. The duration $T_3$ of the one-shot pulse of the transfer end signal $S_{14}$ is longer than the period beginning with the appearance of the second reserve signal $S_{16}$ until the completion of the aforementioned writing in the MNOS FETs. The transfer end signal $S_{14}$ is also controlled such that during its presence the setting period indication signal $S_9$ is present. The second falling detection circuit 123 receives the output of the AND circuit 103 and, by detecting the falling of the input, produces the write end signal $S_{26}$ which is a one-shot pulse. The duration of this one-shot pulse is $T_3$ like the transfer end signal $S_{14}$.

The OR circuit 110B receives and provides the OR of the output of the AND circuit 103, output of the AND circuit 111, write end signal $S_{26}$ and transfer end signal $S_{14}$. Thus, while the first and second memories 1 and 2 are being controlled in the setting operation, the OR circuit 110B provides output coupled to the preference circuit 109.

Figure 13:
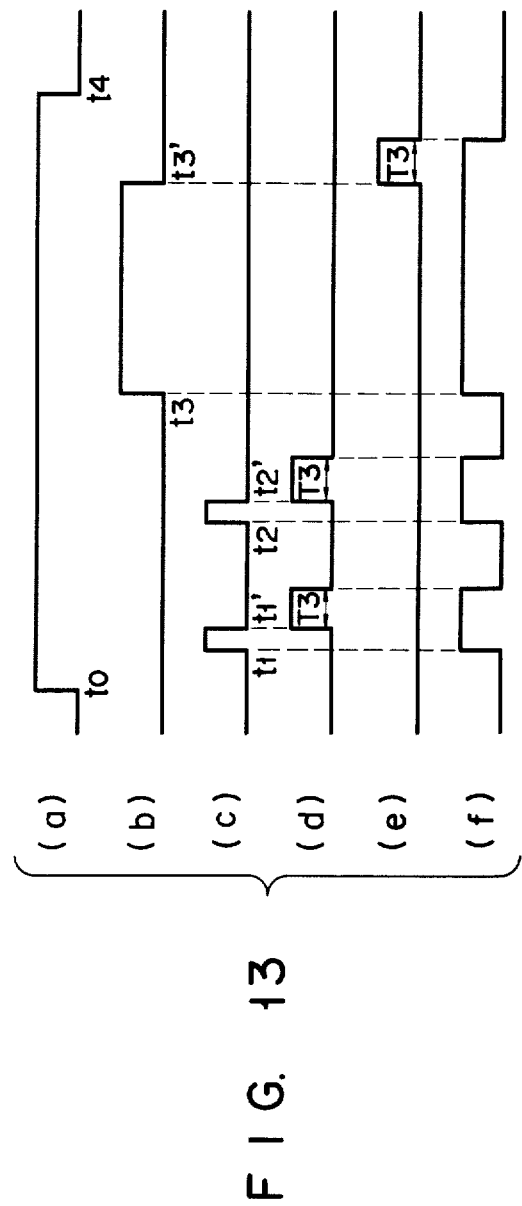
FIG. 13 is a time chart illustrating the operation of the circuit of FIG. 12.

The operation of the address control circuit 6B of FIG. 12 described above will now be described with reference to the time chart of FIG. 13. In FIG. 13, the setting period indication signal S is labeled (a), the writing end signal $S_{26}$ is labeled (b), the write signal $S_1$ is labeled (c), the write end signal $S_{26}$ is labeled (d), the transfer end signal $S_{14}$ is labeled (e) and the output of the OR circuit 110B is labeled (f). The other signals involved in the circuit of FIG. 12 are the same as those discussed in connection with FIG. 6. The write end signal $S_{26}$ is produced for a period $T_3$ from the instants $t_1'$ and $t_2'$ of the end of the write signal $S_1$. The transfer end signal $S_{26}$ is produced for the period $T_3$ from the instant $t_3'$ of the end of the transfer signal $S_5$. The output of the OR circuit 110B is produced for a period between instants $t_1$, and $t_1'$ in addition to the subsequent period $T_3$, a period between instants $t_2$ and $t_2'$ in addition to the subsequent period $T_3$, and a period between instants $t_3$ and $t_3'$ in addition to the following period $T_3$.

The other component elements in the system of FIG. 11 are the same as those shown in FIG. 1 and are designed by like reference symbols. Their description is thus omitted.

The operation of the system of FIG. 11 will now be described. The only difference between the operation of the system of FIG. 11 and that of the system of FIG. 2 is that the first and second memories 1 and 2 of the former are controlled by the non-volatile character control section or memory control signal generator 9. This difference will be described here. While it has been described in connection with FIG. 1 that the setting data from the setting section 3 is written in the first memory 1 under the control of the write signal $S_1$ produced from the first switch 4 with the depression thereof, when the write signal $S_1$ is coupled to the address control circuit 6B, the end of the writing operation is detected, and the write end signal $S_{26}$ is supplied to the non-volatile character control section 9. With the write end signal $S_{26}$ supplied, the non-volatile character control section 9 supplies the first reserve signal $S_{15}$ to the first memory 1. With the first write signal $S_3$ coupled to the first memory 1, the setting data from the setting section 3 is written in the MOS flip-flop in this memory. Also, with the first reserve signal $S_{15}$ supplied to the memory, the data from the MOS flip-flop is written in the MNOS FETs. Thus, by depressing the first switch 4, the setting data from the setting section 3 is preserved as non-volatile data in the first memory 2. The memorized data from the first memory 1 is transferred to the second memory 2 under the control of the transfer signal $S_5$ produced from the switch 5. At the instant the transfer ends the transfer end signal $S_{14}$ is produced from the address control circuit 6 and coupled to the non-volatile character control section 9. With the transfer end signal $S_{14}$ supplied, the non-volatile character control section 9 supplies the second reserve signal $S_{16}$ to the second memory 2. The memorized data in the first memory 1 that is written in the MOS flip-flop in the second memory $S_{16}$, i.e., the new setting value, is written in the MNOS FETs under the control of the second reserve signal $S_{16}$. In this way, by turning "off" the second switch 5, the new setting value is not only transferred from the first memory 1 to the second memory 2, but also it is preserved as non-volatile data in the second memory 2. Thus, with the system of FIG. 11 the memorized data in the first and second memories 1 and 2 are preserved as non-volatile data in a state in which the control power source is established, so that no control is needed at the time of the loss of the power source. At the time of the recovery of the control power source, the non-volatile character control section 9 detects this and supplies the reproduce signal $S_{17}$ to the first and second memories 1 and 2. This control is entirely the same as that effected by the non-volatile character control signal $S_{10}$ shown in FIG. 1.

The method of controlling the first and second memories by the non-volatile character control section, as mentioned above in connection with FIG. 11, may be applied to the construction of FIGS. 7 and 8 as well as to the construction of FIG. 2.

Also, while in the above embodiments the first and second address signals produced from the address control circuit when transferring the memorized data from the first memory to the second have different values, this is by no means limitative. In other words, the first and second address signals may have the same value. In cases in which the address signals have the same value, the control in the address control circuit can be simplified.

As has been described in the foregoing, with the setting device for a protective control system, it is possible to readily set values for a number of elements with a small-sized device. Also, with the use of two non-volatile memories capable of both reading and writing, the setting values can be preserved even when the control power source is lost without the aid of any particular measures to cope with power failure. Furthermore, the arithmetic processing for the protective control can be resumed immediately after the recovery of the power source without resetting the values. Further, it is possible to change setting values even during the operation of the system.

What we claim is:

1. A setting device for a protective control system comprising:
   a data bus;
   a setting unit provided for supplying to said data bus a setting value data required for an operation of said protective control system; and
   a processing section connected to said data bus for receiving said setting value data so as to carry out a predetermined protective control operation according to a plurality of operating elements by using said setting value data;
   wherein said setting unit comprises;
   a setting section connected for supplying to said data bus said setting value set by an operator for each of said operating elements;
   a first non-volatile memory connected to said data bus for storing said setting value;
   a first switch for supplying to said first non-volatile memory a first write signal for each of said operating elements in response to an operation of the operator;
   a first selector circuit;
   a second selector circuit;
   an address setting means for supplying to said first selector circuit an address output which is an address value of said first non-volatile memory corresponding to a designated operating element designated in accordance with a setting value set at the setting section by an operator; and a second non-volatile memory connected to said data bus for storing said setting value;

said setting device further comprising a second switch for supplying to a transfer control means a transfer signal in response to an operation of an operator after a set operation of an element requiring a setting value being set;

said transfer control means including;

an oscillator means for generating clock signals; and a counter means supplied with said clock signals and said transfer signal for supplying to said first and second selector circuits, when said transfer signal is supplied thereto, a counter output having a value successively varying upon counting said clock signals and for delivering a first read signal and a second write signal, said first read signal being for reading said setting value of said first non-volatile memory for each vlue of said counter output and said second write signal being for writing said setting value of said first non-volatile memory read out by said first read signal into said second non-volatile memory;

said first selector circuit being adapted to receive said address output, counter output and transfer signal for delivering to said first non-volatile memory said counter output as a first address signal upon the receipt of said transfer signal and for delivering to said first non-volatile memory said address signal as said first address signal when no transfer signal is supplied to said first selector circuit;

said second selector circuit being adapted to receive said counter output, a third address signal delivered from said processing section and a second read signal for outputting to said second non-volatile memory said third address signal as a second address signal upon the receipt of said second read signal and for outputting to said second non-volatile memory said counter output as the second address signal when no second read signal is supplied to said second selector circuit;

said setting device further comprising a control means for monitoring the output of a power supply to deliver a non-volatile memory control signal to said first and second non-volatile memories;

said processing section comprising a programmed means for outputting said second read signal and said third address signal to receive from said data bus a plurality of said setting values stored in said second non-volatile memory, and for carrying out a predetermined protective control operation with respect to an operating element corresponding to said setting value by using said received setting values.

2. A setting device for a protective control system comprising:

a data bus;

a setting unit provided for supplying to said data bus a settting value data required for an operation of said protective control system; and a processing section connected to said data bus for receiving said setting value data so as to carry out a predetermined protective control operation according to a plurality of operating elements by using said setting value data;

wherein said setting unit comprises;

a setting section connected for supplying to said data bus said setting value set by an operator for each of said operating elements;

a first non-volatile memory connected to said data bus for storing said setting value;

a first switch for supplying to said first non-volatile memory a first write signal for each of said operating elements in response to an operation of the operator;

a first selector circuit;

a second selector circuit;

an address setting means for supplying to said first selector circuit an address output which is an address value of said first non-volatile memory corresponding to a designated operating element designated in accordance with a setting value set at the setting section by an operator; and a second non-volatile memory connected to said data bus for storing said setting value;

said setting device further comprising a second switch for supplying to a transfer control means a tarnsfer signal in response to an operation of an operator after a set operation of an element requiring a setting value being set;

said transfer control means including;

an oscillator means for generating clock signals;

a clock means supplied with said clock signals and said transfer signal for supplying to said first and second selector circuit, when said transfer signal is supplied thereto, a counter output having a value successively varying upon counting said clock signals and for delivering a first read signal and a second write signal; and a means for forming a read signal of said first non-volatile memory by obtaining a logical sum of said first read signal delivered from said transfer control means and a second read signal of said processing section, said read signal being for reading said setting value of said first non-volatile memory for each value of said counter output and said second write signal being for writing said setting value of said first non-volatile memory read out by said first read signal into said second non-volatile memory;

said first selector circuit being adapted to receive said address output, counter output, a third address signal, transfer signal and said second read signal for delivering to said first non-volatile memory said counter output as a second address signal upon the receipt of said transfer signal, for delivering to said first non-volatile memory said third address signal as said second address signal upon the receipt of said second read signal, and for delivering to said first non-volatile memory an address output as said second address signal upon the receipt of said address output, counter output or the third address signal;

said second selector circuit being adapted to receive said counter output, a third address signal delivered from said processing section and a second read signal for outputting to said second non-volatile memory said third address signal as a second address signal upon the receipt of said second read signal and for outputting to said second non-volatile memory said counter output as the second address signal when no second read signal is supplied to said second selector circuit;

said setting device further comprising a control means for monitoring the output of a power supply to deliver a non-volatile memory control signal to said first and second non-volatile memories;

said processing section comprising a programmed means for outputting said second read signal and said third address signal to read out from said first non-volatile memory said setting values, and for judging whether the contents of said second non-volatile memory and said first non-volatile memory coincide with each other to carry out the protective control operation using said setting value upon the coincidence of said contents and to deliver an alarm signal upon the non-coincidence of said contents.

3. A setting device according to claim 2, which further comprises means for delivering a setting period indication signal indicating that the setting unit is being operated by an operator from said second switch to said processing section, said processing section further comprising means for judging whether said contents of said second non-volatile memory and said first non-volatile memory coincide with each other when said setting period indication signal is not supplied thereto and for carrying out the protective control operation using the contents of said second non-volatile memory.

4. A setting device for a protective control system comprising:
   a data bus;
   a setting unit provided for supplying to said data bus a setting value data required for an operation of said protective control system; and
   a processing section connected to said data bus for receiving said setting value data so as to carry out a predetermined protective control operation according to a plurality of operating elements by using said setting value data;
   wherein said setting unit comprises;
   a setting section connected for supplying to said data bus said setting value set by an operator for each of said operating elements;
   a first non-volatile memory connected to said data bus for storing said setting value;
   a first switch for supplying to said first non-volatile memory a first write signal for each of said operating elements in response to an operation of the operator;
   a first selector circuit;
   a second selector circuit;
   an address setting means for supplying to said first selector circuit an address output which is an address value of said first non-volatile memory corresponding to a designated operating element designated in accordance with a setting value set at the setting section by an operation; and
   a second non-volatile memory connected to said data bus for storing said setting value;
   said setting device further comprising a second switch for supplying to a transfer control means a transfer signal in response to an operation of an operator after a set operation of an element requiring a setting value being set;
   said transfer control means including;
   an oscillator means for generating clock signals; and
   a counter means supplied with said clock signals and said transfer signal for supplying to said first and second selector circuits, when said transfer signal is supplied thereto, a counter output having a value successively varying upon counting said clock signals and for delivering a first read signal and a second write signal, said first read signal being for reading said setting value of said first non-volatile memory for each value of said counter output and said second write signal being for writing said setting value of said first non-volatile memory read out by said first read signal into said second non-volatile memory;
   said first selector circuit being adapted to receive said address output, counter output and transfer signal for delivering to said first non-volatile memory said counter output as a first address signal upon the receipt of said transfer signal and for delivering to said first non-volatile memory said address signal as said first address signal when no transfer signal is supplied to said first selector circuit;
   said second selector circuit being adapted to receive said counter output, a third address signal delivered from said processing section and a second read signal for outputting to said second non-volatile memory said third address signal as a second address signal upon the receipt of said second read signal and for outputting to said second non-volatile memory said counter output as the second address signal when no second reaad signal is supplied to said second selector circuit;
   said setting device further comprising a control means for monitoring the output of a power supply to deliver a non-volatile memory control signal to said first and operation with respect to an operating element corresponding to said setting value by using said received setting values.

5. A setting device for a protective control system comprising;
   a setting unit including;
   a setting section connected for supplying to a data bus a setting value set by an operator for each of a plurality of operating elements;
   a first non-volatile memory connected to said data bus for storing said setting value;
   a first switch for supplying to said first non-volatile memory a first write signal for each of said operating elements in response to an operation of the operator;
   a first selector circuit;
   a second selector circuit;
   an addressed setting means for supplying to said first selector circuit an address output which is an address value of said first non-volatile memory corresponding to a designated operating element designated in accordance with a setting value set at the setting section by an operator;
   a second non-volatile memory connected to said data bus for storing said setting value; and
   a second switch for supplying to a transfer means a transfer signal in response to an operation of an operator after a set operation of an element requiring a setting value being set;
   said transfer control means including;
   an oscillator means for generating clock signals; and
   a counter means supplied with said clock signals said transfer signal and a DMA signal provided from a DMA control circuit for supplying to said first selector circuit and said second non-volatile memory, when said transfer signal is supplied thereto, a counter output having a value successively varying upon counting of said clock signals and for delivering a first read signal and a second write signal for controlling a transfer operation, said first read signal being for reading said setting value of said first non-volatile memory for each value of said counter output and said second write signal being for writing said setting value of said first non-volatile memory read out by said first read signal into said second non-volatile memory, said counter means being further adapted for delivering said counter output to said first selector circuit and said second non-volatile memory, upon the receipt of said DMA signal, and delivering for each value of said counter output said first read signal and said second read signal for reading out said setting value of said second non-volatile memory to said DMA control circuit, so as to control reading of said setting values of said first and second non-volatile memories to control said DMA control circuit;

said first selector circuit being adapted to receive said address output, counter output, transfer signal and said DMA signal for delivering to said first non-volatile memory said counter output as a first address signal upon the receipt of said transfer signal or said DMA signal and for delivering to said first non-volatile memory said address signal as said first address signal when neither of said transfer signal and DMA signal is supplied to said first selector circuit;

said second selector circuit being adapted to receive said counter output, a third address signal delivered from said processing section and a second read signal for outputting to said second non-volatile memory said third addresss signal as a second address signal upon the receipt of said second read signal and for outputting to said second non-volatile memory said counter output as the second address signal when no second read signal is supplied to said second selector circuit;

said setting device further comprising a control means for monitoring the output of a power supply to deliver a non-volatile memory control signal to said first and second non-volatile memories; and a DMA permission control means for receiving said first read signal, second read signal and DMA signal to deliver to said DMA control circuit and processing unit a first DMA permission signal allowing said DMA control circuit to access said first and second non-volatile memories when neither of said first and second read signals is not supplied to said DMA permission control means while only said DMA signal is supplied thereto;

said DMA control circuit including means for outputting to said DMA permission control means said DMA signal being outputted with a predetermined interval, means for latching successively said setting value of said first and second non-volatile memories appearing on said data bus when said first DMA permission signal is supplied thereto, and means for outputting successively to said processing unit said latched setting value when a second DMA signal delivered from said processing unit is supplied thereto, and a processing section comprising a programmed means having a means for outputting said second DMA permission signal to said DMA control circuit when said first DMA permission signal is supplied thereto and an output of said DMA control circuit is allowed to be supplied thereto, means for reading out said setting value outputted from said DMA control circuit, and means for judging whether the contents of said first and second non-volatile memory coincide with each other, carrying out the protective control operation using said setting value when a coincidence is detected, and outputting an alarm signal when a noncoincidence is detected.

* * * * *